(No Model.)

W. H. DIEDRICK.
ROAD SCRAPER.

No. 515,999. Patented Mar. 6, 1894.

Witnesses
Molbry Haynes
James T. Summerville

Inventor
William H. Diedrick
By Joshua B. Webster
Attorney

UNITED STATES PATENT OFFICE.

WILLIAM H. DIEDRICK, OF STOCKTON, CALIFORNIA, ASSIGNOR TO JOHN D. McDOUGALD, OF SAME PLACE.

ROAD-SCRAPER.

SPECIFICATION forming part of Letters Patent No. 515,999, dated March 6, 1894.

Application filed April 24, 1893. Serial No. 471,632. (No model.)

*To all whom it may concern:*

Be it known that I, WILLIAM H. DIEDRICK, a citizen of the United States, residing at Stockton, in the county of San Joaquin and State of California, have invented certain new and useful Improvements in Road-Scrapers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in that class of earth scrapers which are used in making and leveling roads, excavating ditches, canals, and cellars, and generally in raising and removing loosened soil or gravel to a short distance, and it consists in certain devices and combination of devices as will be fully described in the specification and pointed out in the claims.

Figure 1:
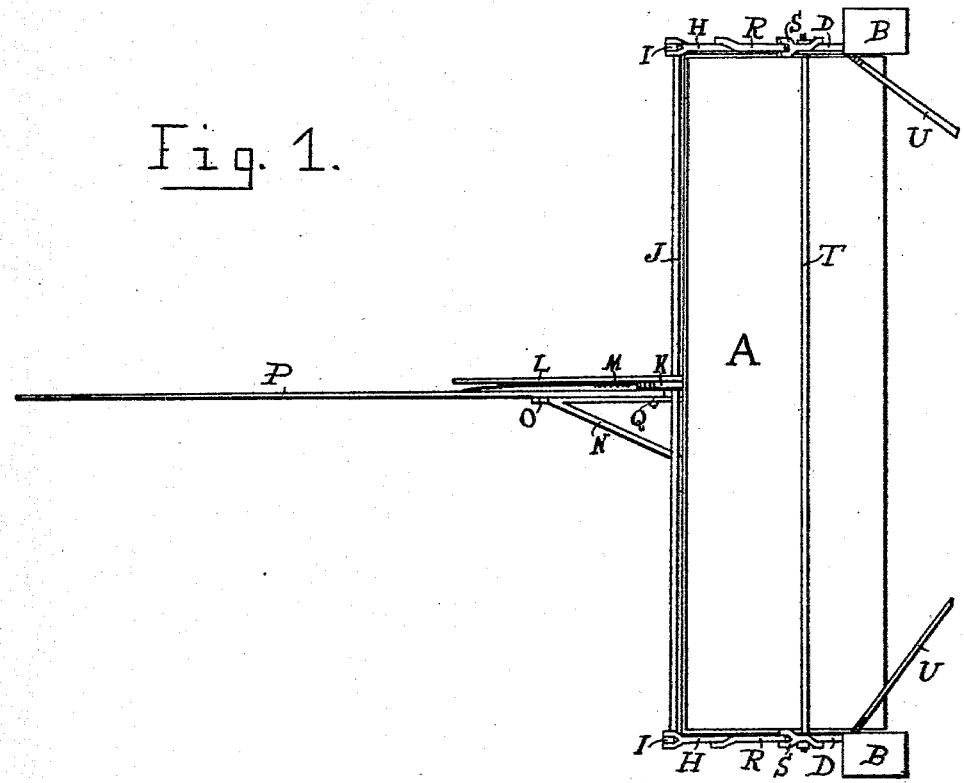
Figure 2:
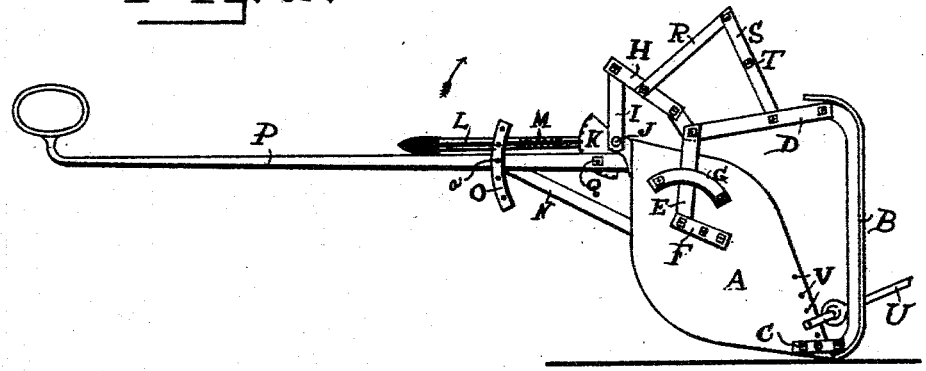

Referring to the accompanying drawings, Figure 1, is a plan view of my improved scraper. Fig. 2, is a right hand side elevation of the same.

Similar letters of reference indicate corresponding parts.

A, is a scraper bowl to which runners B, are flexibly attached near the bottom or blade of the bowl by means of plates C, and at the top by a combination of plates which I will now explain.

D, are angular plates or arms, which are flexibly attached at one end to the top or front ends of the runners B, and are supported by plates or arms E, which are flexibly attached at the upper ends to the angles of the plates or arms D, and at the lower ends to plates F.

G, are circular guiding plates which are attached to the ends of the bowl A.

Attached at one end to the inner end of the plates or arms D, are plates or arms H, which are flexibly attached at their other ends to the top ends of vertical arms I, which are fixedly attached to a rock shaft J, which is journaled in bearings on the back of the scraper bowl near the top of same.

Fixedly connected to the back of the bowl A, is a segmental rack K, which is designed to be engaged by the detent M, of the lever L, which lever is fixedly connected to the shaft J. This lever L, serves to adjust and adjustably fix the runners B, with respect to the bowl A, and it will be readily perceived that when said lever is moved in the direction indicated by the arrow, the arms I, will be swung forward and through the medium of the links H, and the angular levers D, will move the upper ends of the runners away from the bowl A, and cause the lower ends of the runners to move downwardly and raise the bowl. When the lever L, is moved in a direction opposite to that indicated, the upper ends of the runners will be be moved toward the bowl and their lower ends will be drawn upward so as to lower the bowl. Thus it will be seen that the bowl may be readily adjusted to suit the scraper to various kinds of soil.

N, indicates a bracket which is fixedly connected to the rear side of the bowl A, and extends rearwardly therefrom; and O, indicates a segment rack which is fixed at the rear end of the brace N, as shown.

P, indicates an adjustable operating lever which is pivotally or flexibly attached to the rack K, at the point Q′, and engages with the segment rack O, by means of a pin *a*.

R, indicates arms flexibly attached at their lower ends to the arms H, adjacent to the middle of the same.

S, indicates arms which are flexibly attached to the ends of the arms R, and to the arms D; and T, indicates a stop rod which is fixedly connected to the arms S, as shown.

The arms R, and S, afford a support for the rod T, and the said rod T, serves, when the bowl is turned over upon the runners as will be presently described, to engage the draft rods U, so as to prevent the bowl from swinging over too far. The rod T, is especially advantageous when the scraper is employed on declivities or inclines, where the bowl is liable to fall forwardly. The draft rods U, are connected to the bowl by bolts which take through apertures V, formed in the ends of the bowl. A vertical series of apertures V, are provided in the bowl, as shown, so as to enable the operator to fasten the draft rods U, at various elevations and thereby regulate the angle at which the forward edge of the bowl takes into the ground.

My improved scraper is operated as follows: The operator locates the lever P, in such position with relation to the rack O, as will give the best results; that is, in such position as will be the most convenient for him, governed by his own height; for a short man at the bottom of the rack O, and for a tall man at the top of the same. The team is attached to the draft rods U, and the scraper bowl is filled with soil or gravel, as the case may be, then the scraper is tilted back from contact with the ground by means of the lever P, when the loaded scraper is driven to the place where it is desired to deposit its load. On the way to the dumping ground the operator regulates the runners by means of the hand lever L, and the connecting mechanism before described so as to deposit the soil or gravel in large or small quantities as desired; and when he arrives at the place of deposit, he raises the lever P, until the bowl A, rests upon the runners when its contents will be distributed evenly over the ground. If the operator desires to deposit the entire load of the scraper at one spot, it is simply necessary for him to raise the bowl through the medium of the handle P, until the runners rest entirely upon the ground and the bowl rests above the same. This is also the position of the parts when it is desired to move the scraper from place to place,

Having thus described my invention, what I claim as new, and desire to secure by Letters Patent, is—

1. In a road scraper, the combination with the scraper bowl A, provided with the holes V, of the plates C, the adjustable runners B, the arms D, E, H, I, R, and S arranged as described, the plate F, the circular plate G, the rock shaft J, the segment rack K, the lever L, fixed to the shaft J and provided with the spring detent M, the bracket brace N provided with the segment rack O, the adjustable lever P, flexibly attached at the point Q, and to the rack O, by the pin, a, the draft rod U and the stop rod T, all operating substantially as shown and described.

2. In a scraper, the combination substantially as described with a scraper bowl, of suitable runners flexibly and adjustably attached thereto, suitable means for operating such runners, suitable draft rods, a suitable stop rod, and lever for operating such scraper.

3. In a dirt scraper, the bowl A, in combination with the runners B, flexibly secured at the bottom of the bowl and a means for adjusting said runners at the will of the operator at the rear of the scraper for regulating the distribution of material from the bowl, substantially as shown and described.

4. In a road scraper, the bowl A, in combination with the runners B, and the means for adjusting them with such bowl, consisting of the connecting plates or arms D, E, F, and suitable mechanism, connecting such arms with the operating lever L, and guiding lever P, all as shown and described.

5. In a road scraper, the dirt bowl A, in combination with suitable supporting runners B, flexibly attached to such runners by suitable arms, and means for operating the bowl consisting essentially of the flexible adjusting plates or arms D and E, the securing plates F and G, the controlling arms H and I, the arms R, and S, provided with the stop rod T, the rock shaft J, the segment rack K, shaft J the lever L, having the detent M, adapted to engage said segment rack, and the adjustable operating lever P, all substantially as shown and described.

In testimony whereof I affix my signature in presence of two witnesses.

WILLIAM H. DIEDRICK.

Witnesses:
 JOSHUA B. WEBSTER,
 JAMES T. SUMMERVILLE.